US008583449B2

(12) United States Patent
Schofield et al.

(10) Patent No.: US 8,583,449 B2
(45) Date of Patent: Nov. 12, 2013

(54) METHOD AND APPARATUS FOR PROVIDING NETWORK BASED LOAD BALANCING OF MEDICAL IMAGE DATA

(75) Inventors: Bruce Schofield, Tyngsboro, MA (US); Bruce Wallace, Ashton (CA); Franco Travostino, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 2555 days.

(21) Appl. No.: 10/805,993

(22) Filed: Mar. 22, 2004

(65) Prior Publication Data

US 2005/0213832 A1 Sep. 29, 2005

(51) Int. Cl.
*G06Q 50/00* (2012.01)

(52) U.S. Cl.
USPC .............................................. 705/2

(58) Field of Classification Search
USPC ............ 705/2, 4; 709/224, 226, 227; 718/105
See application file for complete search history.

(56) References Cited

U.S. PATENT DOCUMENTS

| 5,031,089 | A  | * | 7/1991  | Liu et al. ...................... 709/226 |
| 6,263,368 | B1 | * | 7/2001  | Martin ........................... 709/224 |
| 6,301,617 | B1 | * | 10/2001 | Carr .............................. 709/227 |
| 6,389,448 | B1 | * | 5/2002  | Primak et al. .................. 718/105 |
| 2002/0006216 | A1 |   | 1/2002  | Armato, III et al. |
| 2002/0016718 | A1 | * | 2/2002  | Rothschild et al. ............... 705/2 |
| 2003/0165262 | A1 |   | 9/2003  | Nishikawa et al. |

OTHER PUBLICATIONS

R. Hollebeek, *Digital Radiology on NGI WANs, NSCP/NDMA*, University of Pennsylvania, US-UK Workshop on Grid Computing, Aug. 4, 2001 (37 pages).
*Design Considerations for Medical Image Archive System*, (26 pages).
CommsDesign, *FPGA Architecture Ups Intrusion Detection Performance*, Oct. 2003 (10 pages).
Frost & Sullivan, Enabling Picture Archiving Communicaitons System with EMC Automated Networked Storage Solutions, 2003, (7 pages).
Enterasys Networks, *St. John's Hospital Premium Health Care through Enterasys Solutions*, (2 pages), Oct. 20, 2003.
PC Consultant Group, Inc. PACS&RIS, A practical outline, (4 pages) Oct. 20, 2003.
White Paper Series, No. 6, version 2, *The DICOM Messaging Implementation of the CMS system*, Feb. 2003 (4 pages).

* cited by examiner

*Primary Examiner* — John Pauls
(74) *Attorney, Agent, or Firm* — Anderson Gorecki & Rouille LLP

(57) ABSTRACT

A method and apparatus for providing network based load balancing of medical image data among two or more image archive systems is disclosed. A network element is employed to interface to a network carrying medical image data that may include tasks to be performed on the data. A network service associated with the network element monitors the current load or the available capacity of each of the image archive systems. When a task is received the network service determines the level of complexity of the task and compares the level of complexity to the current load or available capacity of each of the image archive systems. The network service selects the one of the image archive systems to perform the task that has the lowest current load or highest available capacity relative to the level of complexity of the received task.

14 Claims, 4 Drawing Sheets

US 8,583,449 B2

METHOD AND APPARATUS FOR PROVIDING NETWORK BASED LOAD BALANCING OF MEDICAL IMAGE DATA

BACKGROUND OF THE INVENTION

1. Field of the Invention

This invention generally relates to load balancing systems and in particular to network based load balancing systems of medical image data.

2. Description of Related Art

Medical diagnostic imaging allows radiologists to perform diagnosis of many types of injury and disease by imaging various internal body parts. For example, radiologists utilize diagnostic imaging to visualize organs in the abdomen, the chest cavity, the brain and central nervous system, and the musculoskeletal system. Diagnostic imaging may be used to detect potential cancer abnormalities; bone densitometry; joint, bone, or soft tissue injuries; and many types of diseases. Presently, diagnostic imaging includes many different types of imaging technologies such as x-rays, ultrasound, computed tomography, magnetic resonance imaging, and nuclear medicine to name but a few.

Traditionally, almost all diagnostic imaging was film based. An image was recorded on a physical piece of film that had to be developed, provided to the physician for viewing, reviewed by the physician, and recorded and stored in an archive. Often there was a significant time delay between the taking of the image and the physician reviewing the image. In addition, the storage of film images required a large physical space and associated record keeping. If a physician needed to refer to a patient's stored records, the film images needed to be physically found, retrieved, and provided to the physician. Often there was a significant time delay in this process as well.

To address these issues, diagnostic imaging technology has advanced and medical diagnostic imaging has shifted from a film based system, to a digitally based system in which diagnostic images are recorded, transferred, viewed, and stored electronically. A hard copy or print out of a diagnostic image may never need to be made. However, the storage of radiological images in digital format is a non-trivial problem due to the very large volume of data that these images contain. For example, projectional X-ray Images require very high resolution to be clinically acceptable. Such images may be acquired and stored in image matrices of more than 2000 by 2000 pixels, with a dynamic range of 8 to 12 bits per pixel. This represents between 4 and 8 Mbytes per stored image. Digital imaging modalities such as computed tomography or magnetic resonance imaging currently generate images with smaller matrices (typically 256×256 or 512×512 with a dynamic range of 12 to 16 Bits per pixel), but generate very large numbers of images during each diagnostic examination that are then combined to form a three-dimensional volume image. Indeed, one examination can generate as few as twenty to in excess of more than one hundred images. This corresponds to storage requirements between 10 and 700 MBytes per diagnostic imaging event. Thus, the electronic database, storage, processing and network resources that are necessary to store, retrieve, transmit, and render a diagnostic image must be capable of handling large size files efficiently and quickly.

One image archiving system that has been developed to store and catalog the medical image files is generally referred to as a Picture Archive and Communication System (PACS). A PACS provides an integrated system that receives image data from one or more imaging modalities, processes the image data as needed, stores the image data within a database, retrieves the data when required, and serves the data to be displayed for review by the physician or a technician. However, because all images and most image based transactions are either processed or passed through the PACS, it often acts as a bottle neck to the flow of image data within the network.

SUMMARY OF THE INVENTION

A method and apparatus for providing network based load balancing of medical image data is disclosed. According to one embodiment of the invention, a network service is configured to monitor the current load or available capacity of two or more image archive systems and to receive medical image data that may include a task associated with the medical image data. The medical image data may be, for example, in a DICOM message format that includes both image data and one or more tasks to be performed. The network service determines the complexity of the task(s) to be performed and selects one of the plurality of image archive systems to execute the task(s). The network service selects the image archive system to execute the task(s) as a function of the current load/available capacity of the particular image archive system and the level of complexity of the task(s) to be performed. In one embodiment, the selection is the image archive system that has the lowest current load or highest available capacity with respect to the complexity of the task(s) to be performed.

BRIEF DESCRIPTION OF THE DRAWINGS

Aspects of the present invention are pointed out with particularity in the appended claims. The present invention is illustrated by way of example in the following drawings in which like references indicates similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been describe in detail so as not to obscure the invention.

A method and apparatus for providing network based load balancing of medical image data for a cluster of two or more image archive systems, such as a Picture Archive Communication System (PACS), a cluster of reviewing and reporting stations, or for use with a Radiology Information System (RIS) to distribute the required functionality among the various systems is provided. According to an embodiment of the invention, a network service is provided and configured to receive medical data (data) and transaction commands ("tasks") and to distribute the data and/or tasks based on a set of predetermined criteria. The PACS may serve many roles in the medical imaging work flow. For example and without limitation, a PACS may manage the scheduling, acquisition, processing, reviewing, annotating, printing, reporting, and archiving of image data. It should be appreciated that the processes described herein may be applied to any of these functions, or other functions a PACS may perform.

The predetermined criteria may be selected to reduce the time lag of each task in order to increase the number of tasks that can be executed in a given time period. In this way, each task is allotted a fair share of the available resources. Alternatively, as will be explained below, the predetermined criteria may be selected to provide for a greater share of the resources to be available to a fewer number of high priority tasks, while the majority of tasks are executed by a smaller share of the resources. By increasing the number of tasks that may be executed, embodiments of the invention may increase the number of executed tasks the image archive server is able to perform and may decrease the bottleneck effect of the image archive system.

Figure 1:
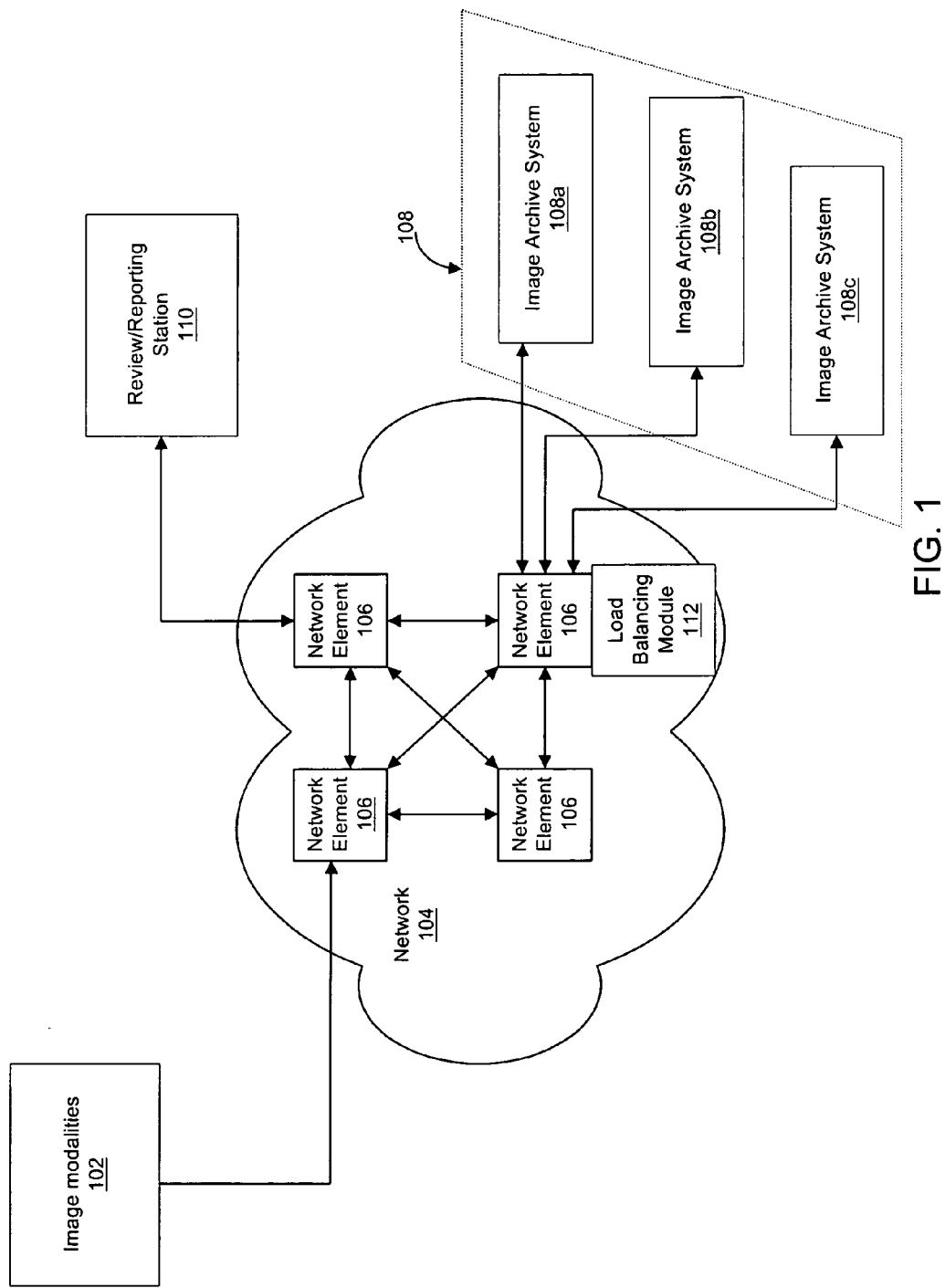
FIG. 1 is a functional block diagram of a network environment incorporating an embodiment of the present invention.

FIG. 1 illustrates an example of a network in which a load balancing service is coupled to a network element to provide load balancing on behalf of a cluster of image archive systems. As illustrated in FIG. 1, one or more imaging modalities 102 are configured to generate medical image data. The imaging modalities may include, without limitation, an x-ray system, a computer tomography system, an ultrasound system, a magnetic resonance imaging system, or a nuclear medicine system. Other modalities may be used and the invention is not limited to these particular modalities. The image modalities 102 may create medical image data in a DICOM compliant image data format, or a non-DICOM compliant image data format. In the event that the image data is in a non-DICOM compliant image data format, a DICOM gateway 103 reformats the non-DICOM compliant image data into DICOM compliant image data. The DICOM compliant image data is transferred to a desired destination for storage, processing, or display via a network 104 that is made up of one or more network elements 106. The network 106 may be an enterprise network, such as a Local Area Network that may be deployed in a medical facility or other facility. Examples of several typical networks may be a Hospital Information System (HIS) or a Radiological Information System (RIS). Alternatively, the network 106 may be a more extensive network such as a wide area network ("WAN"), a metro area network ("MAN"), a public network such as the Internet, or other large scale network.

The image data provided by the image modalities 102 can be provided to an image archive system 108 that includes a plurality of image archive systems 108a-108c for storage or to a reviewing/reporting workstation 110 where the data is displayed and reviewed by a radiologist or technician. According to an embodiment of the present invention, a load balancing network service ("the network service") 112 is deployed on the network to provide load balancing functionality. The network service 112 may be located on or associated with one or more of the network elements 106 configured to communicate on the network.

The network element 106 may be a router, bridge, gateway, content switch, or other types of network devices, each of which must be capable of providing the network service with the required processing capability, control logic functions, and memory resources to carry the extraction/compression functionality described herein. Alternatively, as will be explained in more detail below, the network service may be embodied within a blade server that is provided with an interface to the associated network element 106, but that has its own processor, memory, and control logic, and is capable of executing the functionality described herein in software, hardware, or a combination thereof.

The network element 106 associated with the network service 112 is preferably a content switch configured to filter data packets to identify particular packets and inspect the identified packets to determine their content. For example, a content switch may monitor the data packet traffic on the network 104 by setting filter values to identify packets on the network 104 that contain a destination address of the image archive system 108. The identified packets may be retrieved from the network 206 and stored in a memory within network element. The network element may then inspect the retrieved data packets to determine what type of data and/or tasks they contain. The invention is not limited to this embodiment however.

Since DICOM messages are generally relatively large, transmission of a DICOM message on the network 104 will typically require the DICOM message to be broken up into parts, each of which will be transported separately on the network. Depending on the type of network, different types of protocol data units may be used to transport the data over the network. A group of packets or other protocol data units that make up a complete DICOM image will be referred to herein as a flow. The network element 106 is configured to filter packets or other protocol data units belonging to a flow and is further configured to store the protocol data units until sufficient data has been received to enable the load balancing service to begin to distribute the DICOM image data or tasks to one of the cluster of image archive systems. Depending on the type of compression used by the modalities and/or DICOM gateway, this may range from one packet to a complete DICOM image.

In the embodiments described herein, the network based load balancing functions are performed on behalf of a cluster of two or more image archive systems. However, other systems may be clustered and for which load balancing may be used. For example, and without limitation, the reviewing/reporting workstation 110 may be a cluster of workstations for which load balancing is used. In addition, the network based load balancing functions may be used in a RIS system, or for other medical image/data systems such as pathology, orthopedic surgery such as arthroscopic surgery, retina scans, and other instances that make use of medical image data.

Figure 2:
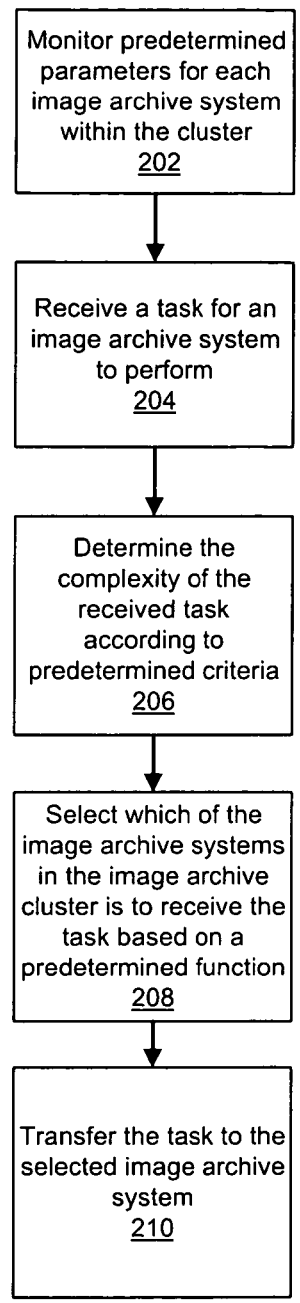
FIG. 2 is a flow chart illustrating a process according to an embodiment of the present invention.

FIG. 2 is a flow chart that illustrates a process for performing network based load balancing according to an embodiment of the invention. The process may be implemented in software, hardware, firmware, in a combination thereof, or in another manner. As illustrated in FIG. 2, the network service monitors one or more parameters for each of the plurality of image archive systems and determines the current load, the available capacity, or both of each of the plurality of image archive systems (202). The parameters may include not only the load level of the particular image archive server but may also include the parameters related to the storage system of the image archive system. The parameters may also include current resource allocation, i.e., the resources that are available to certain processes or the priority level of various resources. In addition, the parameters may include the current state of the network, i.e., the network capacity and availability.

A task is received by the network service that is addressed to the image archive system for execution thereby (204). Typically, the task will be embedded within a DICOM message, which may also include image or textual data as well.

The network service identifies the task within the DICOM message and extracts it. The network service determines the level of complexity of the received task, or assigns a priority to the task using predetermined criteria (206). Typically, the level of complexity of a task will be based on the amount of resources that are required to execute the task such as processor time or memory, or the complexity may be a function of the time that is required to execute the command. Alternatively, the network service may assign a priority to the task. The priority may be based on predetermined criteria and provided to the network service or stored therein. The priority may be based on the source address of the message, the destination address of the message, the individual sending the message, or on the command itself.

The network service selects one a destination, such as a PACS, to receive the task based on the current load or predetermined priority of each of the plurality of image archive systems and the level of complexity of the received task (208). In one embodiment, the network service selects a resource, e.g., PACS, reviewing/reporting station, or other resource, that has the lowest load or greatest available capacity relative to the level of complexity of the task. Alternatively, one or more systems, e.g., PACS or reviewing/reporting stations or other network resources, may be assigned a priority such that these resources are reserved for tasks that have been assigned a priority that is greater than or equal to the priority of the particular resource. In another alternative, tasks that have a higher priority can preempt a task, i.e., stop it from being executed, and take over that resource and be executed thereby.

The network service transfers the task to the selected resource (210).

Figure 3:
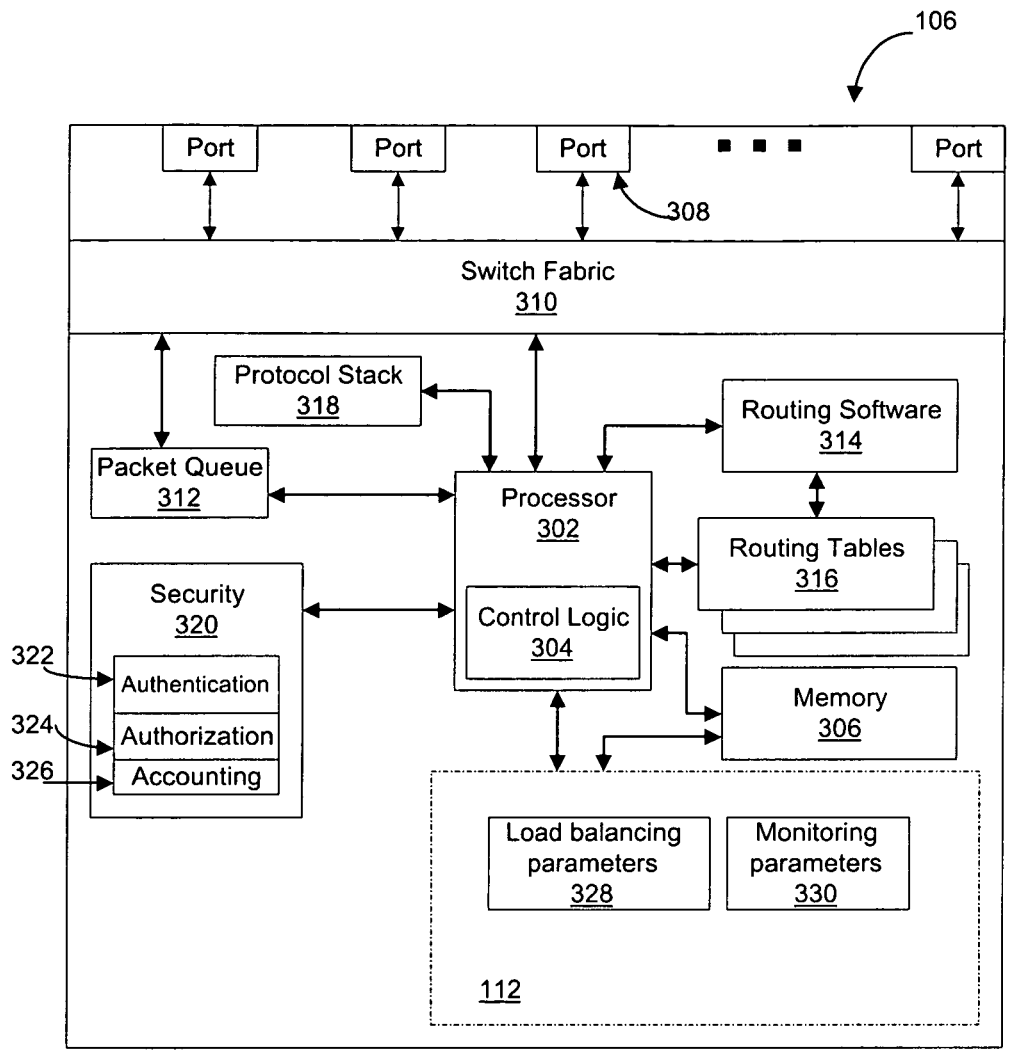
FIG. 3 is a functional block diagram of a network element according to an embodiment of the invention located.

FIG. 3 depicts a network element according to an embodiment of the present invention. In particular the network element 106 illustrated in FIG. 3 generally includes a processor 302, which includes control logic 304, and a memory 306. The processor 302, control logic 304 and memory 306 provide the functionality and control of the network element 106. The network element 106 also includes one or more network data ports 308 that enable the network element 106 to be connected to the network 204. A switch fabric 310 under the control of the processor 302, is provided to interconnect the network data ports 308 and to direct packets therebetween. The switch fabric 310 may be supported by a packet queue 312 that is configured to temporarily store packets or other protocol data units prior to transmission on the network or before being processed by the processor 302.

The network element 106 may also include one or more subsystems under the control of the processor 302 and control logic 304. For example, if the network element is configured to make routing decisions over the network, routing software 314 and routing tables 316 containing routing information may be provided to enable the network element to route data packets and other protocol data units on the network. Other subsystems may include for example a protocol subsystem that includes a protocol stack 318 that is configured to store data and instructions to enable the network element to participate in protocol exchanges on the network. The network element 106 may also include a security subsystem 320 that may include an authentication module 322 that is configured to store authentication information to authenticate users, devices, network connections, or a combination thereof. The security subsystem 320 may further include an authorization module 324 that is configured to provide authorization information to prevent unauthorized access to the network, the network element, or both. The security subsystem 320 may also include an accounting module 326 that is configured to enable accounting entries to be established for sessions on the network, the network element, or both.

As illustrated in FIG. 3, the network device 106 is configured to perform the load balancing service, which has been described above in greater detail in connection with FIGS. 1-3. In particular, a load balancing network service module ("network service module") 112 that is capable of performing the load balancing functionality is coupled to the processor 302, control logic 304, and memory 306 of the network device 106. The network service module 112 includes load balancing parameters 328 and monitoring parameters 330 as required to implement the functionality described above.

Figure 4:
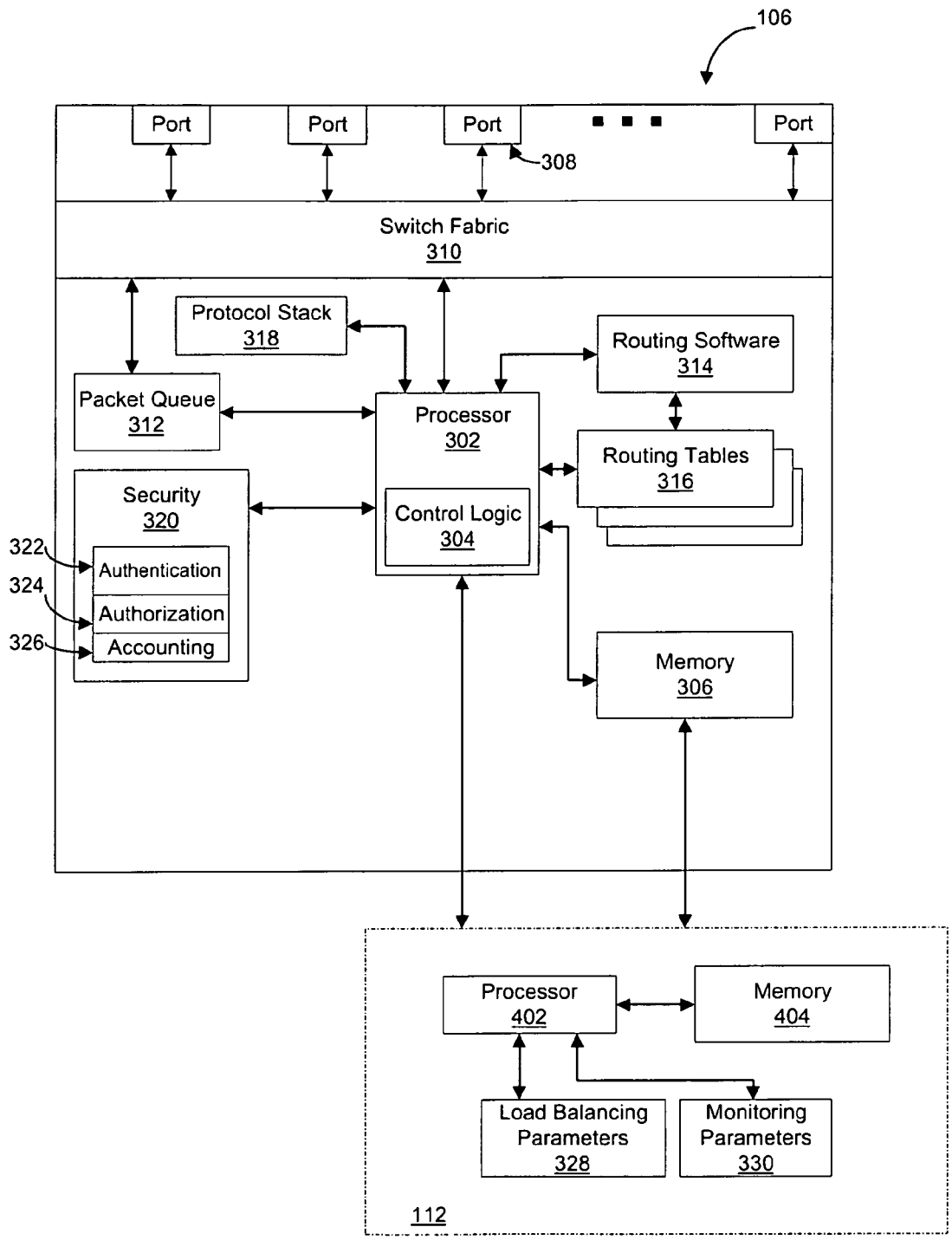
FIG. 4 is a functional block diagram of a network element and associated network service module according to an embodiment of the present invention.

The network service module 112 may be implemented on a network element 106 as illustrated in FIG. 3 or may be implemented on a separate computer platform so that the network service module 112 can also be implemented separate from the network element 106 as illustrated in FIG. 4. In the embodiment illustrated in FIG. 4, the network service module 112 includes a processor 402 and a memory 404 in addition to the components described above with respect to FIG. 3. In this embodiment, the network service module 112 can be implemented, for example, as a blade server external to the associated network element 106, but coupled thereto to enable the blade server to receive and transmit messages via the network 104 and to make use of the processor and memory and other resources available within the network element 106.

The functions described above may be implemented as a set of program instructions that are stored in a computer readable memory within the network element and executed on one or more processors within the network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be appreciated that other variations to and modifications of the above-described method and system for transferring and compressing medical image data may be made without departing from the inventive concepts described herein. Accordingly, the invention should not be viewed as limited except by the scope and spirit of the appended claims.

What is claimed is:

1. A method for performing network based load balancing of medical image data among a plurality of image archive resources by a network service deployed on a network element implemented on the network, the method comprising the steps of:

monitoring, by the network service, a parameter associated with each of the plurality of image archive resources indicative of an available capacity of each of the plurality of image archive resources;

receiving, by the network service, medical image data to be load balanced to a selected at least one of the plurality of image archive resources, the medical image having embedded therein instructions associated with a task to be performed by the selected at least one of the plurality of image archive resources in connection with processing the medical image data, the task being addressed to the at least one image archive resource for execution by the at least one image archive resource and being embedded within a DICOM message;

extracting the instructions, by the network service, from the DICOM message, the instructions being associated with the task that is addressed to the at least one image archive resource for execution by the at least one image archive resource;

determining from the instructions, by the network service, a level of complexity of the task that is addressed to the at least one image archive resource for execution by the at least one image archive resource;

selecting, by the network service, at least one of the plurality of image archive resources to be used to perform the task in connection with processing the medical image data, the step of selecting using, as a selection function, the available capacity of each of the plurality of image archive resources and the level of complexity of the task that is to be performed by the selected at least one image archive resource; and transferring, by the network service, the medical image data to the selected one of the plurality of image archive resources.

2. The method of claim 1 wherein the step of selecting comprises selecting the one of the image archive resources having the greatest available capacity relative to the complexity level of the task to be performed.

3. The method of claim 1, wherein the plurality of image archive resources comprises a plurality of Picture Archive Systems (PACS).

4. The method of claim 3 wherein the parameter is one of the group consisting of the PACS server load, or the PACS storage time.

5. The method of claim 1 wherein, the parameter is an image archive resource load.

6. The method of claim 1, wherein the selection function is further based on a priority level of the task and a priority level of the image archive resource.

7. The method of claim 6, wherein the step of selecting comprises selecting the one of the plurality of image archive resources having a priority less than or equal to the priority level of the task.

8. An apparatus for performing network based load balancing of medical image data among a plurality of image archive resources, the apparatus comprising:

a network element coupled to a network and configured to send and receive data via the network; and a network service coupled to the network element, the network service configured to:

monitor a parameter associated with each of the plurality of image archive resources indicative of an available capacity of each of the plurality of image archive resources;

receive medical image data to be load balanced to a selected at least one of the plurality of image archive resources, the medical image having embedded therein instructions associated with a task to be performed by the selected at least one of the plurality of image archive resources in connection with processing the medical image data, the task being addressed to the at least one image archive resource for execution by the at least one image archive resource and being embedded within a DICOM message;

extract the instructions from the DICOM message, the instructions being associated with the task that is addressed to the at least one image archive resource for execution by the at least one image archive resource;

determine from the instructions a level of complexity of the task that is addressed to the at least one image archive resource for execution by the at least one image archive resource; and select at least one of the plurality of image archive resources to be used to perform the task in connection with processing the medical image data using, as a selection function, the available capacity of each of the plurality of image archive resources and the level of complexity of the task that is to be performed by the selected at least one image archive resource; and transfer the medical image data to the selected one of the plurality of image archive resources.

9. The apparatus of claim 8 wherein the network service is operative to select the one of the image archive resources having the greatest available capacity relative to the complexity level of the task to be performed.

10. The apparatus of claim 8, wherein the plurality of image archive resources comprises a plurality of Picture Archive System (PACS).

11. The apparatus of claim 10 wherein the parameter is one of the group consisting of the PACS server load or the PACS storage time.

12. The apparatus of claim 8 wherein the parameter is an image archive resource load.

13. The apparatus of claim 8, wherein
the selection is further based on a priority level of the task and a priority level of the image archive resource.

14. The apparatus of claim 13, wherein the selection is based on selecting the one of the plurality of image archive resources having a priority less than or equal to the priority level of the task.

* * * * *